Figure 1:
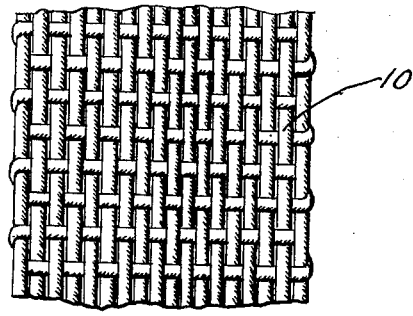

May 18, 1926.

J. A. HEANY 1,585,624

FRICTION FABRIC AND YARN FOR MAKING THE SAME

Original Filed May 13, 1924

INVENTOR
John Allen Heany
BY
Braselton, Whitcomb & DesJardins
ATTORNEYS

Patented May 18, 1926.

1,585,624

UNITED STATES PATENT OFFICE.

JOHN ALLEN HEANY, OF NEW HAVEN, CONNECTICUT, ASSIGNOR TO WORLD BESTOS CORPORATION, OF PATERSON, NEW JERSEY, A CORPORATION OF DELAWARE.

FRICTION FABRIC AND YARN FOR MAKING THE SAME.

Application filed May 13, 1924, Serial No. 712,970. Renewed February 6, 1926.

This invention relates to friction fabrics and yarn for making the same. More particularly, the invention relates to a yarn of more or less general use and friction fabrics made therefrom having special utility in the clutch and brake mechanism of automotive vehicles.

In automotive vehicles, as is well understood, it is an important and desirable factor that the control of the vehicle be smooth and flexible and capable of easy gradations both in starting and stopping the vehicle. A sticking brake or clutch in an automobile, for example, will cause alternate gripping and freeing of the co-acting elements, known as chattering, which interferes seriously with the proper operation of the mechanism.

Heretofore, certain brake, clutch and transmission linings have been constructed of vegetable fibre constituents, as cotton, either alone or impregnated with asphaltum or other hydrocarbon derivatives. Fabrics of this type are not entirely satisfactory for the reason that the impregnant is soluble in oil—which, under certain conditions, is present on the friction surfaces and, in certain automotive vehicles is always present—and, consequently, the bare cotton fibre becomes exposed to the destructive heating action, causing the formation on the fabric surface of a layer of hard carbonaceous material which is inflexible and does not grip smoothly and consistently. Where no impregnant is used, the formation of the carbon layer is more rapid. In either case, the fabric is disintegrated in a relatively short time without giving, during its period of usefulness, satisfactory operation.

Another form of brake lining utilizes a mineral fibre, as asbestos, loosely compacted with cotton holding sheaths or threads. A serious disadvantage of linings of this type is that the structure readily breaks down, permitting the flaked asbestos to be drawn into the oil conduits, clogging the same and thus impairing the operating efficiency of the engine and transmission.

It is an important object of my invention to provide a friction lining which is formed of separate yarns, and which is resistant to heat and frictional wear. An object also is to provide a friction lining of asbestos in which the fibres are bound together, as by binding material or the like, which is oil repellent. A further object is the utilization of a brake fabric of asbestos, wherein the fibrous material is bound in a plurality of ways, thus tending to prevent flaking of the asbestos while in the brake mechanism. An object of importance, also, is to provide a friction fabric for use in automotive vehicles, which is smooth in its operation, and is not carbonized by the heating of the co-acting surfaces. And another of the more important objects of my invention is the provision of a friction fabric which has a surface including asbestos paper-like material, said material being broken up by filaments or strands of oil absorbent material not only to reduce glazing, but to render the fabric soft and more flexible, and also to lubricate the friction surface of the fabric.

Another of the more important objects of my invention consists in providing an asbestos yarn comprising a strand of asbestos material present in paper-like formation, bound with sufficient cohesiveness and tenacity to retain such paper-like formation and having a reinforcing filament of non-mineral fibre wound around the surface of said strand. Another object of the invention is to provide an asbestos yarn comprising a strand of asbestos material, containing binding material, present in paper-like formation and combined with a reinforcing filament or strand composed of non-mineral fibre to lessen the harshness of the same. Another object of the invention is to provide an asbestos yarn adapted for use in friction fabrics, including a core preferably of vegetable or non-mineral fibre, asbestos paper-like material placed about or surrounding said core, and a binding filament of vegetable or non-mineral fibre wound around and embedded in the surface of the asbestos material. Another object of the invention is to provide an asbestos yarn, the surface of which comprises asbestos material containing oil repellant binding material and a reinforcing filament or strand of oil absorbent fibrous material. Another object of the invention is to provide a yarn, including a flexible or yielding core, such as cotton, a paper-like strip of asbestos material containing oil repellent binding material placed about the core, and a filament or strand of oil absorbent fibrous material helically embedded in the surface of said asbestos material. Another important object of the invention is to provide a yarn which lends itself readily to the weaving of the same, when desired, into a friction or other fabric.

Figure 2:
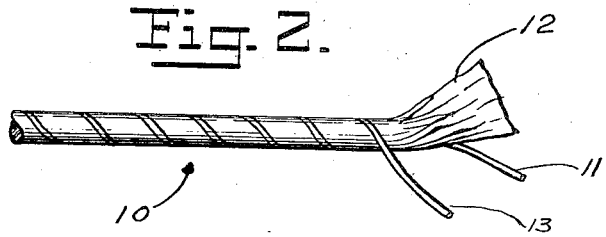
Figure 3:
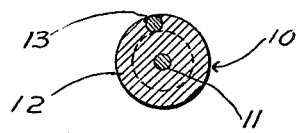
Figure 4:
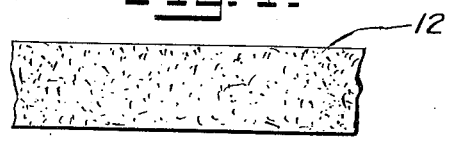

The invention, involving the objects above referred to, consists in certain aspects in utilizing for friction purposes a fabric which is formed preferably of corded asbestos yarn which contains binding material or the like insoluble in oils. Various other aspects and phases of the invention and additional objects relating to the details of construction and manufacture will appear in consideration of the embodiment of the invention which may be preferred, in the following detailed description and accompanying drawing, in which:

Fig. 1 is a view of a portion of the fabric;
Fig. 2 is a length of yarn showing the composite structure thereof;
Fig. 3 is a cross section of the yarn; and
Fig. 4 is a view of a portion of the paper strip used in the yarn structure.

In my co-pending application, Serial Number 680,186, filed December 12, 1923, I have disclosed a fabric for friction uses in which the yarn, referring to the same specifically, is formed of asbestos twisted about a core. In the present invention, I employ a yarn 10 having a core 11 of flexible material, such as cotton, about which the asbestos strip or band 12 is twisted, and a second flexible thread 13 also of cotton or similar fibre twisted or wrapped about the exterior of the asbestos. The asbestos material 12 is preferably in the form of paper strip, as shown clearly in Fig. 4, the fibres of asbestos material being bound by binding and filling material, such, for example, as starch.

The various yarn constituents above mentioned are assembled in the manner, for example, described in my co-pending application, Serial Number 687,218, filed January 19, 1924. In accordance with the process therein described, the paper strip containing a binder is moistened and twisted about a core filament. The strand resulting is then loosely twisted with a second reinforcing filament and finally subjected to a close twist under increased tension to form the finished yarn. Preferably, the core and reinforcing filaments are cotton threads, although other flexible fibrous material may be advantageously utilized. The binder employed may include as an essential constituent various sugars, starches or cellulose, comprising the carbohydrates or various caseins or albumens comprising the proteins, or substances from both of these groups may be combined. The characteristic property of the carbohydrates and proteins which makes them of value as binding agents is that they are substantially not softened by or are insoluble in oils, particularly the mineral oils, and inasmuch as friction fabric is sometimes subjected to the action of oil, a binder which is unaffected thereby is very advantageous as will be brought out more fully hereinafter.

The yarn, manufactured as above indicated, is formed by any suitable means into a relatively strong fabric having preferably a close, dense texture. Preferably the fabric is formed by weaving and in such manner that the friction surface is formed principally of warp yarns. The fabric may be woven in any number of plies or layers, three plies being found to give satisfactory results.

When employed under working conditions in brake or clutch mechanism, the fabric as above described is frequently subjected to the loosening and softening action of lubricating oils. In a well known engine construction, for example, the brake linings and the clutch linings controlling the various speeds are constantly sprayed by heated oil which traverses the clutch chamber and passes through a small conduit to the front engine bearings. While the friction fabric made in accordance with my invention is saturated to some extent by the oil, the fabric, due to the corded structure of the yarn and the use of paper strip to hold the fibres together, and due also to the use of asbestos with its heat resisting qualities and to the important fact that the filler constituent of the yarn is insoluble in oil,—resists successfully all tendency to fracture and disintegration because of tension or because of the high heat attendant upon the operation of the clutch mechanism. The threads 13 wrapped around the asbestos in the different strands of the woven fabric tend to break up the surface and therefore to reduce the glazing effects in service. Such threads 13 form channels in the asbestos surface, and especially when they are made up of cotton or similar fiber tend to distribute oil which may be thrown upon the surface of the fabric. As a result of the material used and the arrangement of the material on the surface of the fabric, the bearing surface of the fabric remains substantially free of the hard, inflexible and non-absorbent layers of free carbon usually formed, and the bearing surface of the fabric closely and uniformly maintains a frictional grasp on the metal coacting surface which is effective at slow as well as at high speeds of operation, and checking or recurrent binding and freeing of the surfaces is practically eliminated.

It is emphasized that the fibres of the fabric are bound in a plurality of ways to prevent them from flaking and entering the oil stream to cause clogging of the passageways.

Primarily, the fibres are bound together in a paper strip by a binding agent which is insoluble in oil. This unitary strip is then formed into a strand preferably by twisting it about a core thread. The strand is then combined with a binding thread, preferably by twisting to form the yarn, and, finally, the yarn is closely woven into the fabric. The asbestos fibres are thus closely united in the friction fabric structure and do not flake off but are maintained uniformly in the material as an effective and efficient friction material and the tendency to glaze is reduced.

From the foregoing, it will be seen that I have provided a new yarn which, in its preferred form, comprises a strand of asbestos paper-like material having combined therewith a plurality of strands of vegetable fibre, such as cotton, one of said strands being helically or otherwise arranged about and embedded in the surface of said strand of asbestos material, with a result that a yarn is produced which is less harsh, more flexible, of uniform strength, and better adapted for the various uses to which it is put. It will also be apparent from the foregoing that I have devised a friction fabric, the surface of, which has areas of asbestos material broken up by and alternating with areas of vegetable fibre, the former of which preferably contains an oil repellent binding material, and the latter of which is preferably oil absorbent. These physical characteristics impart to the fabric several important properties, chief of which are to render the fabric soft as well as flexible, and to provide suitable lubricating means to avoid glazing of the fabric. It will be understood, however, that the tendency of the fabric to glaze and the rendering of the same more flexible is effected, broadly stated, by breaking up the surface of the asbestos material, but the use of filaments of vegetable fibre which are oil absorbent, materially enhances the fabric in these respects. Perhaps the core or tension filament of oil absorbent vegetable fibre is as equally important as the binding filament for the reason that as the fabric "wears down" the core filament of vegetable fibre, sooner or later, becomes exposed after which it serves in turn to function as a lubricating as well as a binding and reinforcing means. I do not claim herein broadly the structure of the yarn illustrated in Figs. 2 and 3 as that constitutes in part the subject matter of my copending application Serial No. 685,300, filed January 24, 1924.

It is obvious that various modifications may be made in the yarn construction or fabric weave or in the filler material of the fabric or in other details without departing from the spirit of the invention as described, and I desire, therefore, to claim the invention broadly as well as specifically, as indicated by the claims hereto appended.

Having thus described my invention, what I claim as new and desire to secure by Letters Patent is:

1. A woven friction fabric, certain of the yarns of which consist of cores, a unitary strand of asbestos twisted around each of said cores, and a binding filament wound around each of the composite strands.

2. A woven friction fabric, certain of the yarns of which consist of cores, a unitary strand of asbestos for each core containing a carbohydrate and being wound around the core, and a binding filament wound around the composite strand so formed.

3. A friction fabric having a surface of asbestos material and fine strands of other material embedded in said surface to break up the same sufficiently to reduce glazing effects in service.

4. A friction fabric having a surface of asbestos material and fine strands of other material embedded in said surface to break up the same sufficiently to reduce glazing effects in service, portions of said strands at said surface extending across the direction of wear.

5. A friction fabric having a surface of asbestos material containing an oil repellent binder and fine strands or other material embedded in said surface to break up the same sufficiently to reduce glazing effects in service, the material of said fine strands being oil absorbent to distribute oil applied to said surface.

6. A friction fabric formed of interengaged yarns and having a surface mainly of asbestos but broken up, to reduce glazing, by strands of vegetable fibre, portions of which are embedded in the asbestos at said surface.

7. A friction fabric formed of interengaged yarns and having a surface mainly of asbestos but broken up, to reduce glazing, by strands of vegetable fibre, portions of which are embedded in the asbestos at said surface, said strands being held in position by the arrangement thereof in helical form around certain of said yarns.

8. A woven friction fabric having a surface mainly of asbestos and formed principally of the warp strands, said surface being broken up, to reduce glazing, by elements of material, other then asbestos, embedded in said surface.

9. A woven friction fabric having a surface mainly of asbestos and formed principally of the warp strands, said surface being broken up, to reduce glazing, by strands of vegetable material arranged in helical form around said warp strands and presenting portions thereof at the surface of the fabric but embedded therein.

10. A friction fabric having a surface of asbestos material having narrow breaks therein formed by small elements of other material embedded in said asbestos at the surface thereof.

11. An asbestos yarn including a paper-like strip of asbestos material, a core with which the asbestos material is combined, and a filament of cotton in the outer surface of said asbestos material.

12. An asbestos yarn including a filamentary core, a paper-like strip of asbestos material in twisted form around said core, and a filamentary thread of vegetable fibre in the form of a winding embedded in the surface of said asbestos material.

13. An asbestos yarn including a core, a paper-like strip of asbestos material containing carbohydrate binding material helically arranged about the core, and a filament of vegetable fibre helically embedded in the surface of said asbestos material.

14. An asbestos yarn adapted for use in friction fabrics, including a core or tension filament, asbestos paper-like material surrounding said filament, and a binding filament arranged about and breaking up the surface of the asbestos material, at least one of said filaments being composed of vegetable fibre.

15. An asbestos yarn adapted for use in friction fabrics, including a core, asbestos paper-like material wound around said core, and a binding filament of cotton wound around and breaking up the surface of the composite strand so formed.

16. An asbestos yarn adapted for use in friction fabrics, including a core of vegetable fibre, asbestos paper-like material containing binding material and arranged about the core, and a binding filament of vegetable fibre helically embedded in the surface of the composite strand thus formed.

17. An asbestos yarn comprising a strand of asbestos paper-like material associated with a tension filament and secured thereto by a binding filament which breaks up the surface of said strand, at least one of said filaments being a vegetable fibre.

18. An asbestos yarn comprising a core filament, asbestos material present in the yarn in paper-like formation and positioned about said filament, and a filament of vegetable fibre binding said material and core together.

19. An asbestos yarn comprising a paper-like strip of asbestos material placed about a core filament of vegetable fibre and bound thereto by a helically arranged filament of vegetable fibre.

20. An asbestos yarn comprising a strand of asbestos material present in paper-like formation, bound with sufficient cohesiveness and tenacity to retain such paper-like formation and having a reinforcing filament of non-mineral fibre wound around and embedded in the surface of said strand.

21. An asbestos yarn comprising a strand of asbestos material, containing binding material, present in paper-like formation, and combined with reinforcing strands composed of non-mineral fibre.

22. An asbestos yarn comprising a strand of asbestos paper-like material bound with sufficient cohesiveness and tenacity to undergo strand and yarn forming operations and having a filament of vegetable fibre helically arranged around and embedded in the surface of said strand.

23. An asbestos yarn for the manufacture of fabrics and other purposes, comprising a strand formed of asbestos paper-like material bound together with sufficient cohesiveness and tenacity and adapted for strand and yarn forming operations and having a plurality of binding filaments of vegetable fibre combined therewith in helical arrangement.

24. An asbestos yarn including a core, a paper-like strip of asbestos material containing oil repellent binding material placed about the core, and a filament of oil absorbent fibrous material helically embedded in the surface of said asbestos material.

25. An asbestos yarn, the surface of which comprises asbestos material containing oil repellent binding material and a reinforcing strand of oil absorbent fibrous material for breaking up the surface of said yarn.

26. An asbestos yarn comprising a strand of asbestos material, containing oil repellent, binding material and present in paper-like formation, and combined with an oil absorbent reinforcement strand helically arranged around said strand.

27. A friction fabric or the like, comprising yarns formed of strands of paper-like strips of asbestos material bound with sufficient cohesiveness and tenacity to undergo strand and yarn forming operations and having reinforcing filaments arranged around and helically embedded in the surface of said strands.

28. A friction fabric or the like, which comprises yarns each of which is formed of a filament of vegetable fibre twisted about and embedded in the surface of a paper-like strip of asbestos material bound together with sufficient cohesiveness and tenacity to undergo strand and yarn forming operations.

29. A friction fabric or the like, which includes yarns, each of which is formed of paper-like strip of asbestos material associated with a tension filament and secured thereto by a binding filament arranged around and helically embedded in the surface of said yarn, at least one of said filaments being composed of vegetable fibre.

30. A friction fabric or the like, comprising yarns formed of strands of paper-like strips of asbestos material bound with sufficient cohesiveness and tenacity and adapted for strand and yarn forming operations, each of said strands having combined therewith a plurality of reinforcing strands of vegetable fibre, one of said strands of oil absorbent fibre being helically arranged about the surface of said strand of asbestos material to reduce glazing and to render the fabric more flexible.

31. An asbestos friction fabric or the like, comprising yarns formed of strands of paper-like strips of asbestos material bound with sufficient cohesiveness and tenacity and adapted for strand and yarn forming operations, each of said strands having in the surface thereof a strand of oil absorbent material for lubricating the fabric and rendering the fabric more flexible.

32. A friction fabric formed of interengaged yarns and having a surface including asbestos paper-like material, the surface of said asbestos material being broken up by strands of oil absorbent material to reduce glazing and to render the fabric more flexible.

In testimony whereof, I affix my signature.

JOHN ALLEN HEANY.